United States Patent
Au et al.

(10) Patent No.: US 10,904,309 B1
(45) Date of Patent: Jan. 26, 2021

(54) MANAGING STORAGE AND TRANSMISSION DATA SIZE IN VIDEO PACKAGING SYSTEMS

(71) Applicant: Amazon Technologies, Inc., Seattle, WA (US)

(72) Inventors: James Ka Sin Au, Richmond (CA); Olaf Nielsen, Portland, OR (US)

(73) Assignee: .Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 15/911,977

(22) Filed: Mar. 5, 2018

(51) Int. Cl.
 *G06F 15/16* (2006.01)
 *H04L 29/06* (2006.01)

(52) U.S. Cl.
 CPC .......... *H04L 65/607* (2013.01); *H04L 65/601* (2013.01)

(58) Field of Classification Search
 CPC .... H04L 65/607; H04L 65/4092; G06F 15/16
 USPC ..................................... 709/231; 375/240.03
 See application file for complete search history.

(56) References Cited

U.S. PATENT DOCUMENTS

| | | | | |
|---|---|---|---|---|
| 2003/0033083 | A1* | 2/2003 | Nakashima | G01C 21/3626 701/411 |
| 2005/0266374 | A1* | 12/2005 | Tse | A61C 5/40 433/102 |
| 2014/0365491 | A1* | 12/2014 | Macaulay | H04L 65/4084 707/737 |
| 2015/0106841 | A1* | 4/2015 | Wolf | H04N 21/8455 725/32 |
| 2015/0296274 | A1* | 10/2015 | Good | H04N 21/26258 725/93 |
| 2016/0077507 | A1* | 3/2016 | Sheble | G06Q 10/06 700/295 |
| 2016/0162478 | A1* | 6/2016 | Blassin | G06Q 10/063112 706/12 |
| 2017/0133054 | A1* | 5/2017 | Song | G11B 27/28 |
| 2017/0237983 | A1* | 8/2017 | Adsumilli | H04N 21/21805 375/240.03 |
| 2018/0143975 | A1* | 5/2018 | Casal | G06F 40/58 |

* cited by examiner

*Primary Examiner* — Tesfay Yohannes
(74) *Attorney, Agent, or Firm* — Knobbe, Martens, Olson & Bear, LLP

(57) ABSTRACT

A content streaming system and methodology for facilitating the management of content streaming. A video packaging and origination service receives streaming content that is organized according to content segments. Individual content segments will be encoded according to a plurality of encoding bitrates including a reference bitrate and one or more additional renditions. The one or more additional renditions include pointers to the baseline rendition.

18 Claims, 10 Drawing Sheets

MANAGING STORAGE AND TRANSMISSION DATA SIZE IN VIDEO PACKAGING SYSTEMS

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery network ("CDN") service provider. As with content providers, CDN service providers also provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or the quality of delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
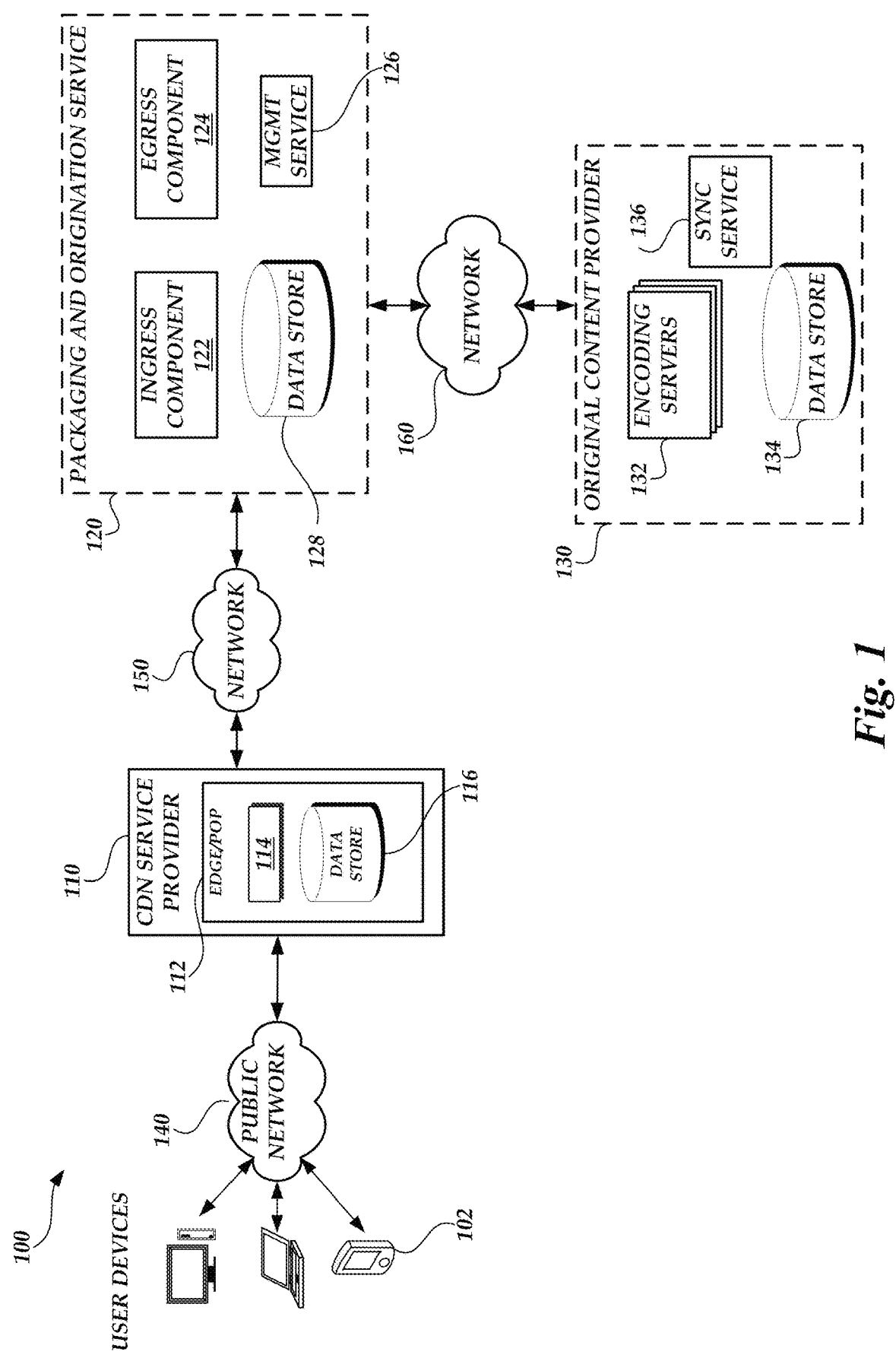
FIG. 1 is a block diagram of a content delivery environment that includes one or more user devices, a video packaging and origination service and an original content provider according to one embodiment.

Generally described, content providers can provide content to requesting users. With regard to video content, a content provider can implement a video packaging and origination service that is able to deliver video content to requesting users. Illustratively, a video packaging and origination service indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service can also provide advanced video transmission features such as just-in-time packaging of video content, digital rights management ("DRM") encryption, time-shifting, bitrate selection, catch up TV, and more.

To deliver content, content providers can organize requested content, such as a video file, into multiple segments that are then transmitted to requesting devices, segment by segment. For example, in a video stream, each segment typically accounts for 2-10 seconds of video rendered on a receiving device. To provide content to the video packaging and origination service, individual content segments can be encoded by an encoder and transmitted to the video and origination service. Traditionally, a single processing node on the video packaging and origination service can receive an incoming stream of encoded segments and then transmit the stream to requesting user devices.

Video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

In some embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, once all the versions of an encoded segment are received by the packaging and origination service, the packaging and origination service is available to receive and process requests for encoded content. More specifically, client computing devices, through a respective software application, can request individual video segments according to the available encoded bitrates and formats as published in the manifest file.

To receive content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

To service requests for content, a video packaging and origination service can maintain a set egress nodes or encoder nodes generate content streams in the form of a set of encoded segments to a requesting entity, such as a CDN service or user devices. Traditionally, to support variable bit rate encoding, the egress nodes of the video packaging and origination service generates multiple versions of the encoded output based on supported framerates or supported bitrates or bitrate and format combinations. For example, for a given format, a video packaging and origination service may offer content encoded according to 4 megabit bitrate, 6 megabit bitrate and 10 megabit bitrate encodings. Supporting multiple bitrate or bitrate/format combinations facilitate differences in video quality from premium quality bitrates (e.g., 10 megabit bitrate encoding) to minimal quality bitrates (e.g., 4 megabit encoding). However, support for multiple bitrate encodings can also increase storage and transportation costs for the video packaging and origination service and content delivery network service providers or require additional networking and storage resources in order to support and implement multiple bitrate versions.

To address at least a portion of the inefficiencies described above with regard to multiple bitrate encoding, a video content and origination service for generating multiple encoded streams utilizing common segment redundancies is provided. More specifically, aspects of the present application correspond to utilization of encoders that are configured to generate a package of multiple encoded bitrates renditions of content and replace interchangeable segments from higher encoding bitrate renditions with references to a designated baseline rendition or intervening renditions. The resulting encoded content with the references can be generally referred to as processed, encoded content streams. The set of encoded content streams, including the processed, encoded content, can be stored and in some embodiments, transmitted for storage at other components. Additionally, the content streams can be further maintained by content delivery network resources in the processed, encoded streams to further minimize costs or increase network performance. To utilize the processed, encoded content streams, a software component can reconstitute higher bitrate renditions of processed, content streams by replacing points with segments from the lower bitrate renditions. Such software components can be implemented by the video packaging and origination service, content delivery networks, or user devices.

Aspects of the present application can be described with regard to an illustrative example of content being encoded with regard to three identified encoding bitrates. The encoder generates a baseline rendition of the encoded content (e.g., rendition 1) that corresponds to a lowest encoded bitrate version of the encoded content. The baseline rendition includes a set of encoded content segments that include some form of segment identifier. For a next higher encoded bitrate version (e.g., rendition 2), the encoder marks one or more interchangeable segments from the next highest encoded bitrate rendition (e.g., rendition 2) that are in common, or interchangeable, with the baseline rendition (e.g., rendition 1). To facilitate interchangeability, individual renditions can have an assigned maximum bitrate. Additionally, individual segments within various renditions can have smaller bitrates than the assigned maximum bitrate for the rendition. For example, for some video scenes not including a great amount of details, the encoded segments bitrates can be lower than each maximum bitrate of the different renditions. Accordingly, multiple renditions can share common segments since the encoded bitrates for the segments are the substantially the same. In still further embodiments, for a highest encoded bitrate version (e.g., rendition 3), the encoder marks one or more segments from such highest encoded bitrate rendition (e.g., rendition 3) that are in common, or interchangeable, with the baseline rendition (e.g., rendition 1) or next higher encoded bitrate rendition (e.g., rendition 2). To reduce the storage or transmission footprint of the package of encoded content streams, the marked, interchangeable segments can be replaced with pointers to the baseline rendition or intervening renditions. To reconstitute the full version of the encoded renditions, a software component can replace the pointers utilized in highest and next higher encoded bitrate versions with corresponding segments from the baseline rendition and next higher encoded bitrate versions (e.g., renditions 1 or 2), as appropriate.

Although aspects of the present application will be described with regard to illustrative examples related to specific bitrate encoding, encoding formats and combinations of bitrate encoding and formats, one skilled in the relevant art will appreciate that the examples are illustrative in nature and should not be construed as limiting.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a video packaging and origination service can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

User devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like. Each user device 102 may optionally include one or more data stores (not shown in FIG. 1) including various applications or computer-executable instructions, such as web browsers or media player software applications, used to implement the embodiments disclosed herein. Illustrative components of a user device 102 will be described with regard to FIG. 2.

In some embodiments, a CDN service provider 110 may include multiple edge locations from which a user device can request content. Individual edge locations 112 may be referred to herein as a point of presence ("POP"), where a POP 112 is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, in some embodiments the POP 112 can include one or more media processing components 114 for processing processed encoded content streams as will be described herein. For example, individual POPs may receive processed, encoded contents streams and be able to reconstitute the processed content streams utilizing the media processing component 114. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and video packaging and origination service 110 are depicted as having a single connection to the network 140, individual components of the client computing devices 102 and video packaging and origination service 110 may be connected to the network 130 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 110 may utilize any number or combination of networks.

In accordance with embodiments, the video packaging and origination service 120 includes one or more servers for receiving content from original content providers 130 and processing the content to make available a set of received encoded bitrate segments. As described in further detail below, the video packaging and origination service 120 includes a plurality of ingress components 122 utilized to receive encoded data streams from encoding servers 132 from content providers 130. The video packaging and origination service 120 also includes one or more servers for receiving content requests for a requesting entity, such as a POPs 112 or user devices 102 and generating encoded, processed content streams as described herein. The ingress components 122 and egress components 124 may be distributed according to geographic criteria or availability zones to facilitate delivery or access to encoded content. Still further, although illustrated as separate components, the ingress and egress components may be integrated into a single component that functions as a combined ingress and egress component as described herein.

The video packaging and origination service 120 can further include management services 126 for generating synchronization information utilized by the encoders, such as sequence numbers corresponding to the set of encoded segments, time stamp information related to a relative time of the encoded segments or from which relative time of encoded segments will be based, and the like. The video packaging and origination service 120 can further include a data store 128 for maintaining generated encoded data for transmission to the user devices 102 and CDN service provider 110.

It will be appreciated by those skilled in the art that the video packaging and origination service 120 may have fewer or greater components than are illustrated in FIG. 1. Thus, the depiction of the video packaging and origination service 120 in FIG. 1 should be taken as illustrative. For example, in some embodiments, components of the video packaging and origination service 120 may be executed by one more virtual machines implemented in a hosted computing environment. A hosted computing environment may include one or more rapidly provisioned and released computing resources, which computing resources may include computing, networking or storage devices. Additionally, while such components are illustrated as logically being logically grouped in FIG. 1, one skilled in the relevant art will appreciate that one or more aspects of the present application can include the video packaging and origination service 120 as being implemented in multiple geographic areas. Additionally, not all geographic areas hosting portions of the video packaging and origination service 120 will necessary have all the same components or combination of components.

With continued reference to FIG. 1, the content delivery environment 100 also includes original content providers 130. Illustratively, the original content provider can include a plurality of encoders 132 for generating multiple encoded streams for transmission to the video packaging and origination service 120. In some embodiments, the original content provider the original content provider 130 can further include synchronization services 136 for generating synchronization information utilized by the encoders, such as sequence numbers corresponding to the set of encoded segments, time stamp information related to a relative time of the encoded segments or from which relative time of encoded segments will be based, and the like. The original content provider 130 can further include a data store 134 for maintaining encoded data for transmission.

Figure 2:
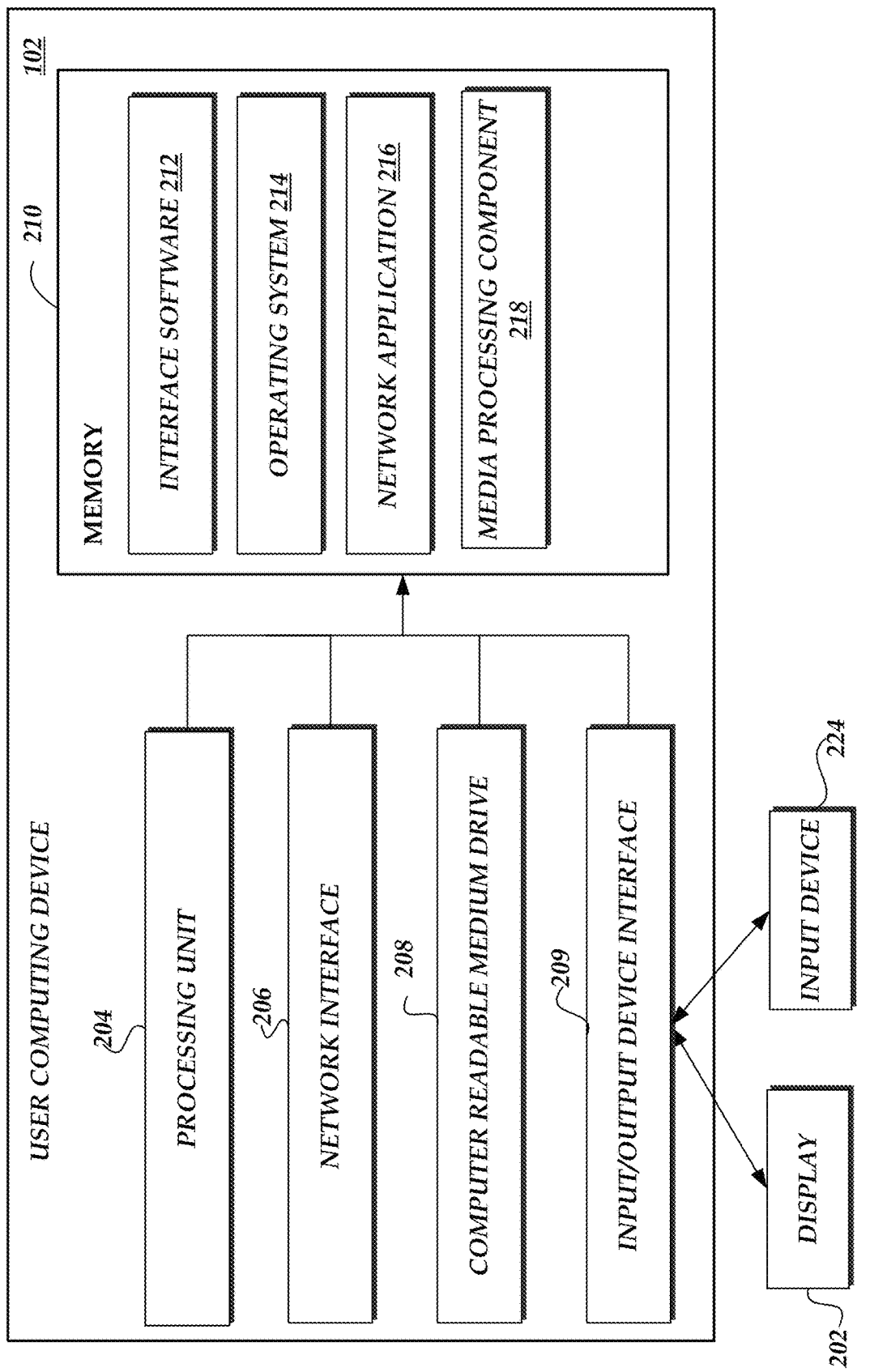
FIG. 2 is a block diagram of illustrative components of a user computing device configured to remotely process content in accordance with an illustrative embodiment.

FIG. 2 depicts one embodiment of an architecture of an illustrative user computing device 102 that can generate content requests and process encoded content in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, a computer readable medium drive, an input/output device interface 209, an optional display 202, and an input device 224, all of which may communicate with one another by way of a communication bus.

The network interface 206 may provide connectivity to one or more networks or computing systems, such as the network 140 of FIG. 1 and the video packaging and origination service 120, the CDN service provider 110, or the original content provider 130. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes a network application 216, such as browser application or media player, for accessing content and communicating with the video packaging and origination service 120. Additionally, in some embodiments, the memory 210 can include a media processing component 218 for processing processed, encoded content streams and reconstituting one or more content streams as described herein.

Figure 3:
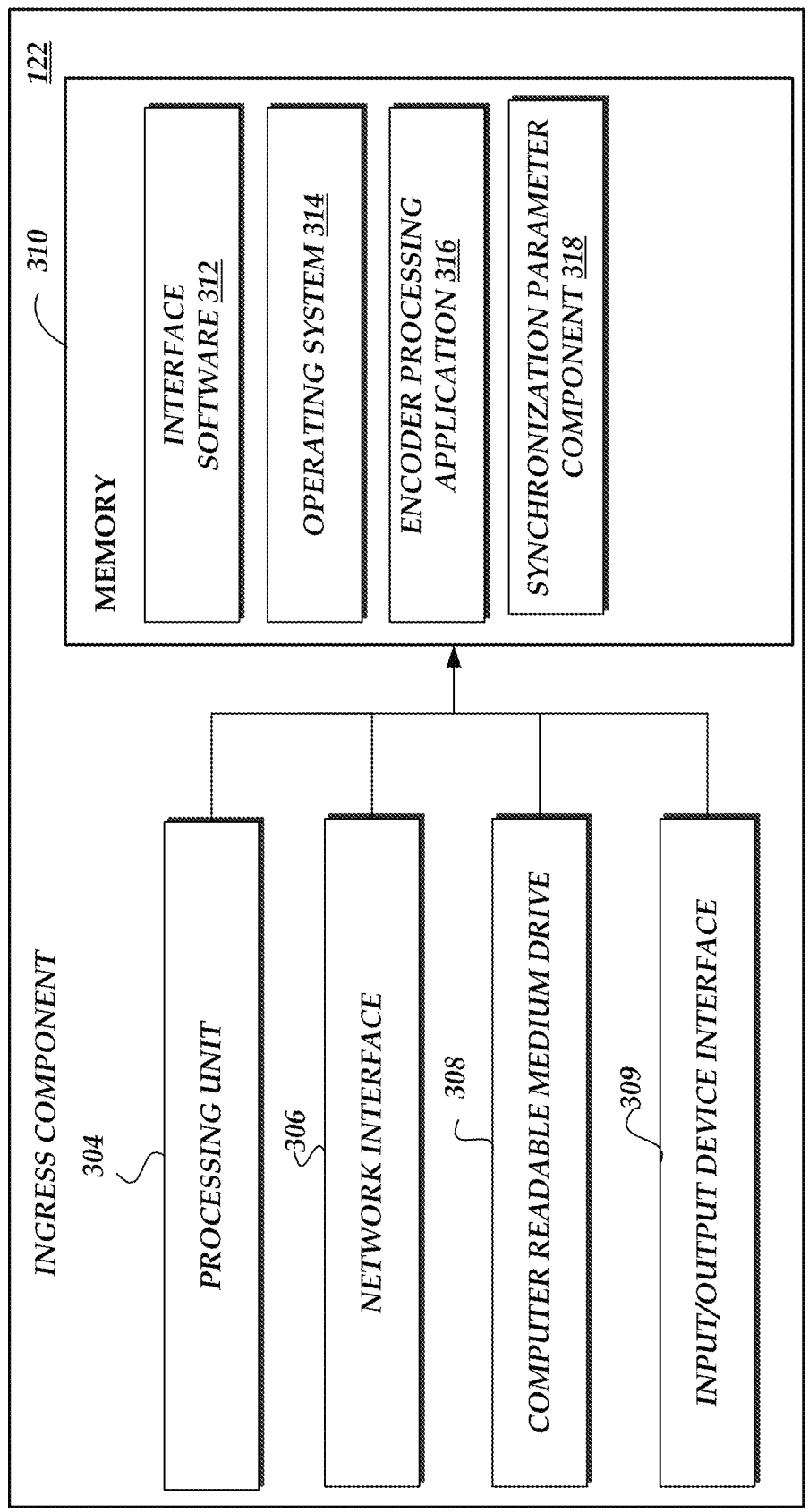
FIG. 3 is a block diagram of illustrative components of an ingress node configured to manage encoder content streams in accordance with an illustrative embodiment.

FIG. 3 depicts one embodiment of an architecture of an illustrative server for functioning as an ingress component 122 as described herein. As described above, the video packaging and origination service 120 includes multiple ingress components 122 (or nodes) that facilitate intake of encoded segments. The general architecture of the ingress component 122 depicted in FIG. 3 includes an arrangement of computer hardware and software components that may be used to implement aspects of the present disclosure. As illustrated, the ingress component 122 includes a processing unit 304, a network interface 306, a computer readable medium drive 308, an input/output device interface 309, all of which may communicate with one another by way of a communication bus. The components of the ingress component 122 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the ingress component 122 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the ingress node. The memory 310 may further include computer program instructions and other information for implementing aspects of the present disclosure. For example, in one embodiment, the memory 310 includes interface software 312 for receiving and processing content from encoders 132. Additionally, the memory 310 includes an encoder processing application 316 for processing incoming encoded content segments. The ingress component 122 can further include a synchronization parameter component 318 for utilizing processing incoming stream data from the original content provider 130

Figure 4:
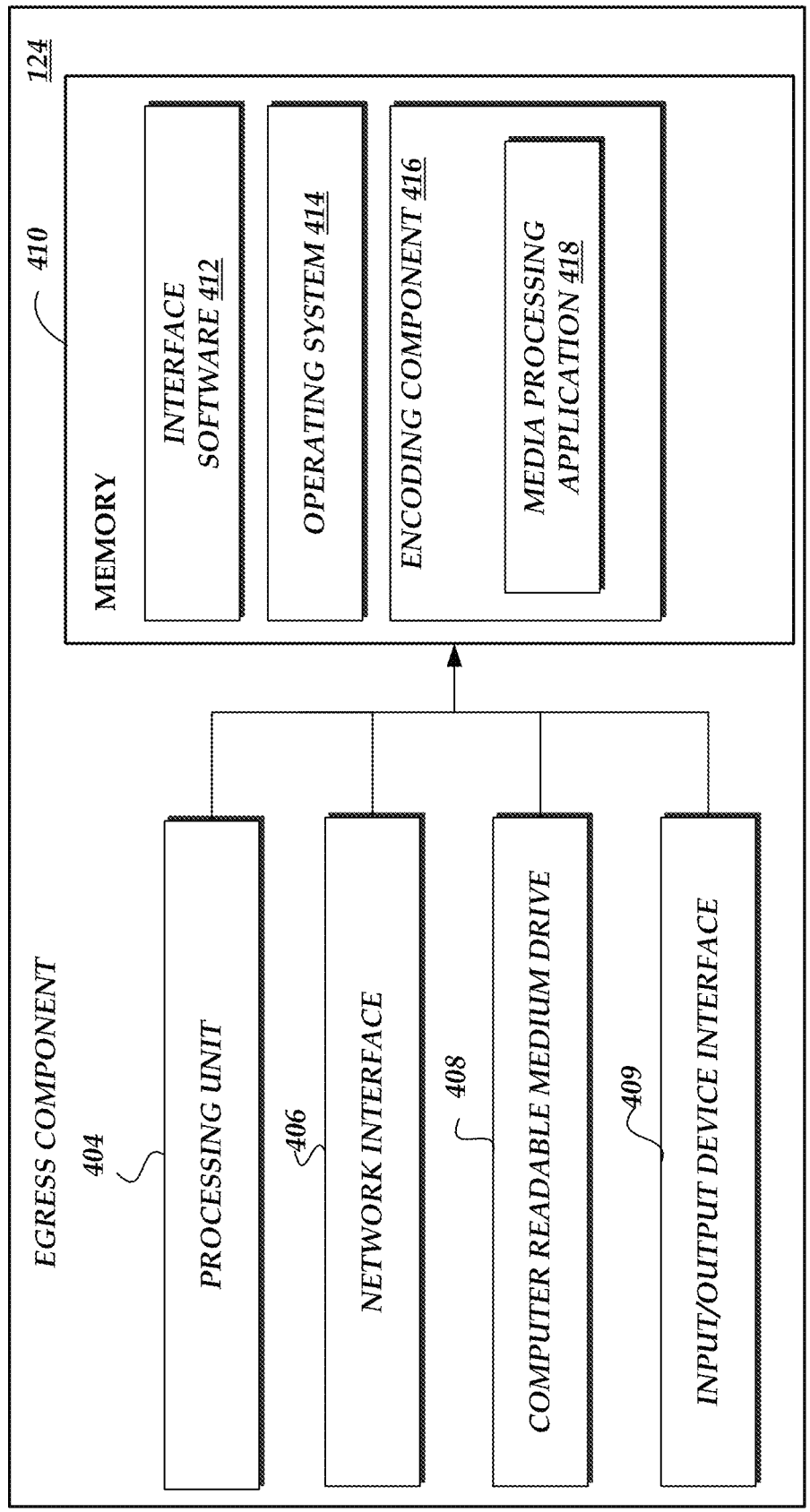
FIG. 4 is a block diagram of illustrative components of an egress node configured to manage content requests from requesting entities in accordance with an illustrative embodiment.

FIG. 4 depicts one embodiment of an architecture of an illustrative server for functioning as an egress component 124 as described herein. As described above, the video packaging and origination service 120 includes multiple egress components 124 (or nodes) that facilitate processing encoded segment content requests from different requesting entities, such as CDN service provider 110 or user devices 102. The general architecture of the egress component 124 depicted in FIG. 4 includes an arrangement of computer hardware and software components that may be used to implement aspects of the present disclosure. As illustrated, the egress component 124 includes a processing unit 404, a network interface 406, a computer readable medium drive 408, an input/output device interface 409, all of which may communicate with one another by way of a communication bus. The components of the egress component 124 may be physical hardware components or implemented in a virtualized environment.

The network interface 406 may provide connectivity to one or more networks or computing systems, such as the network 140 or network 160 of FIG. 1. The processing unit 404 may thus receive information and instructions from other computing systems or services via a network. The processing unit 404 may also communicate to and from memory 410 and further provide output information for an optional display via the input/output device interface 409. In some embodiments, the egress component 124 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the egress component 124. The memory 410 may further include computer program instructions and other information for implementing aspects of the present disclosure. For example, in one embodiment, the memory 410 includes interface software 412 for receiving and processing content requests from requesting entities. Additionally, the memory 410 includes an encoding component 416 for generating encoded content segments. Additionally, the egress component 124 can further include a media processing component 418 that is part of the encoding component 416 that generates processed, encoded components as described herein. Additionally, the media processing component 418 can further facilitate the reconstitution of previously stored processed, encoded components for transmission of full content streams.

Figure 5:
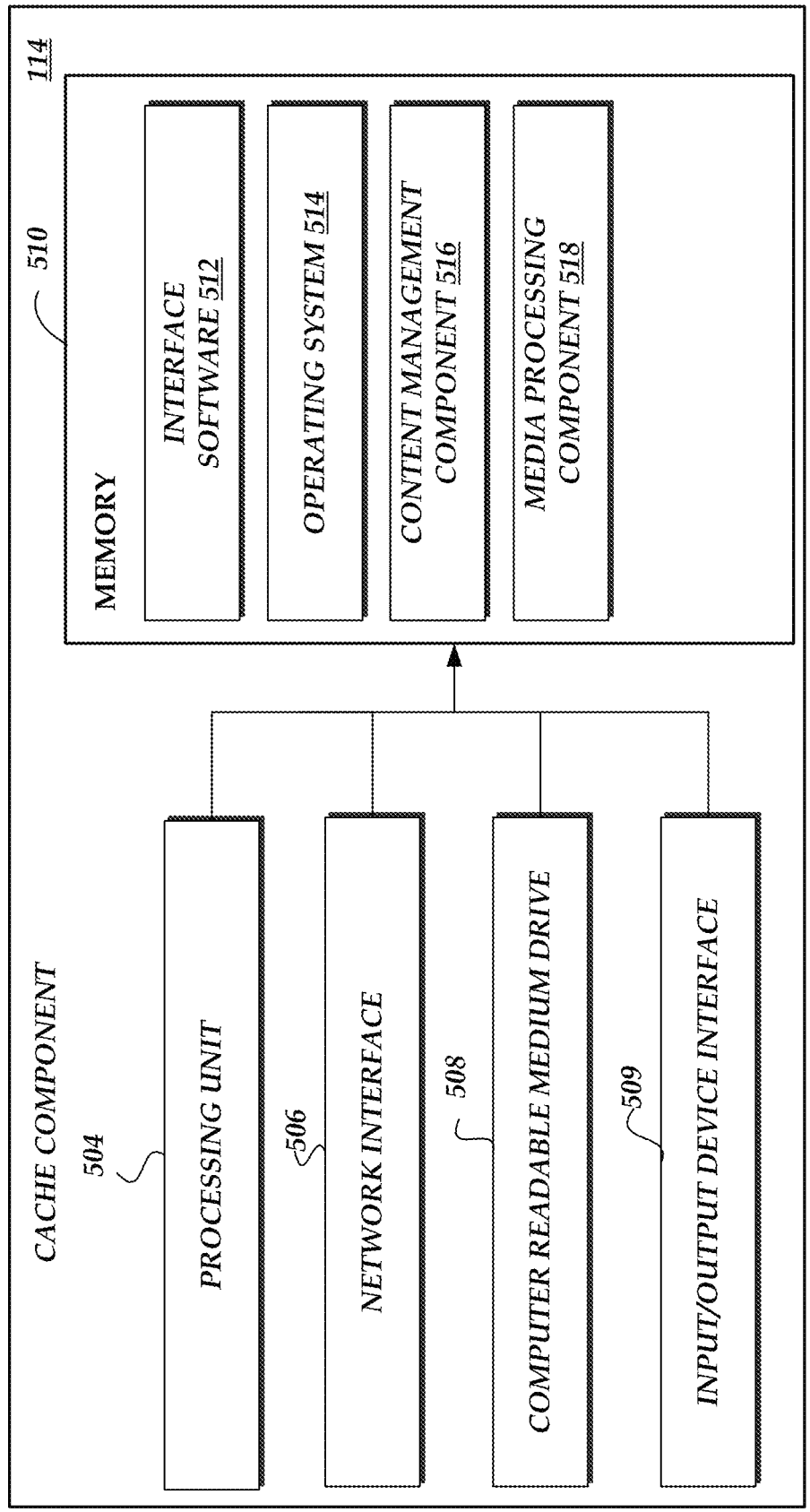
FIG. 5 is a block diagram of illustrative components of a local cache component configured to manage streaming content for processing content requests in accordance with an illustrative embodiment

FIG. 5 depicts one embodiment of an architecture of an illustrative server for functioning as a cache component 114 as described herein. As described above, the CDN service provider includes cache components 114 (or nodes) that facilitate the management of processed, encoded content streams to requesting users. Illustratively, the cache components 114 are part of the CDN service provider 110 and can be managed in manner to optimize the processing and transmission of content streams to requesting users. The cache components 114 may correspond to local edge components or POPS 112 that serve one or more distinct geographic areas. For example, a cache component 114 can have a one-to-one association with a specific geographic region or logical zone and can be optimized according to the attributes of the specific geographic region or logical zone. In another example, a cache component 114 can have a one-to-many association with multiple geographic zones or logical zones and can be optimized to according to the attributes of individual geographic zones or logical or multiple geographic zones or logical zones.

The general architecture of the cache component 129 depicted in FIG. 5 includes an arrangement of computer hardware and software components that may be used to implement aspects of the present disclosure. As illustrated, the cache component 114 includes a processing unit 504, a network interface 506, a computer readable medium drive 508, an input/output device interface 509, all of which may communicate with one another by way of a communication bus. The components of the cache component 114 may be physical hardware components or implemented in a virtualized environment.

The network interface 506 may provide connectivity to one or more networks or computing systems, such as the network 150 or network 160 of FIG. 1. The processing unit 504 may thus receive information and instructions from other computing systems or services via a network. The processing unit 504 may also communicate to and from memory 510 and further provide output information for an optional display via the input/output device interface 509. In some embodiments, the cache component 114 may include more (or fewer) components than those shown in FIG. 5.

The memory 510 may include computer program instructions that the processing unit 504 executes in order to implement one or more embodiments. The memory 510 generally includes RAM, ROM, or other persistent or non-transitory memory. The memory 510 may store an operating system 514 that provides computer program instructions for use by the processing unit 504 in the general administration and operation of the cache component 129. The memory 510 may further include computer program instructions and other information for implementing aspects of the present disclosure. For example, in one embodiment, the memory 510 includes interface software 512 for receiving and processing content streams from the egress servers 124. Additionally, the memory 510 includes a content management component 516 for processing received encoded content segments. Content generation component 516 also includes or access the mass storage utilized to maintain cached content. Additionally, the ingress component 122 can further include a media processing component 518 for obtaining and processing processed, encoded media streams as described herein.

Figure 6A:
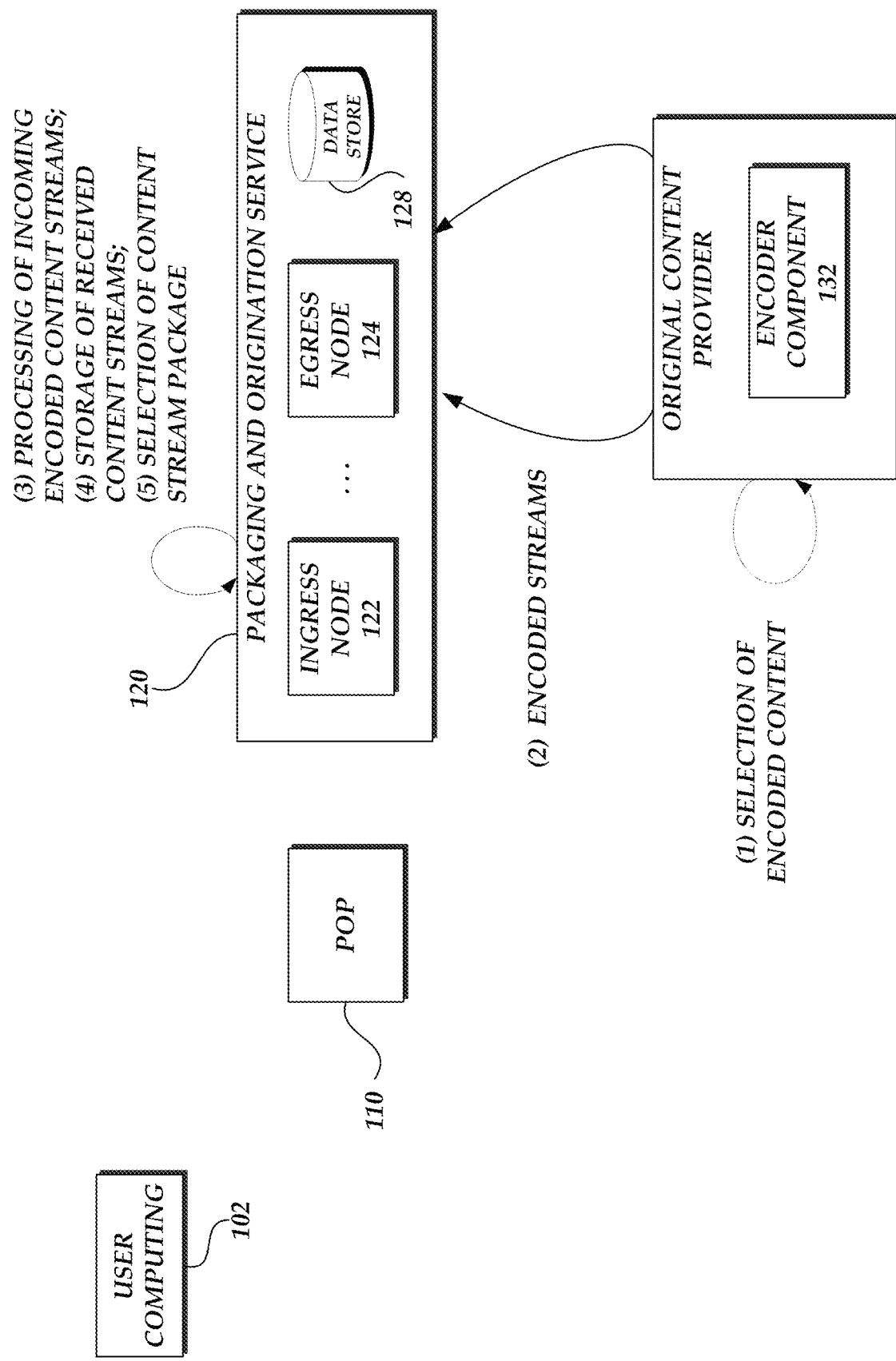
FIGS. 6A-6C are block diagrams of the content delivery environment of FIG. 1 illustrating the interaction related to video packing and origination service for obtaining encoded content for delivery to user devices.
Figure 6B:
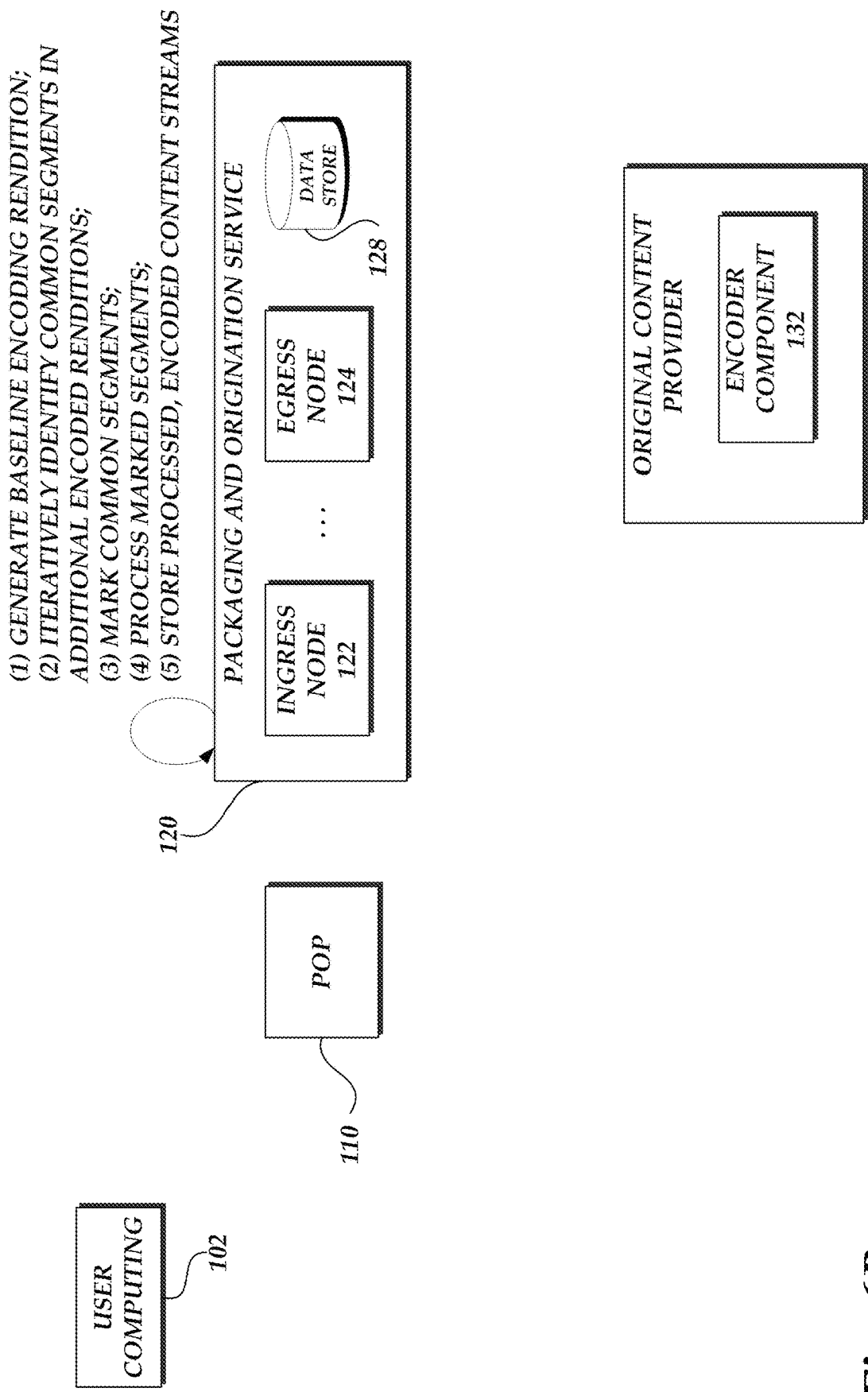
Figure 6C:
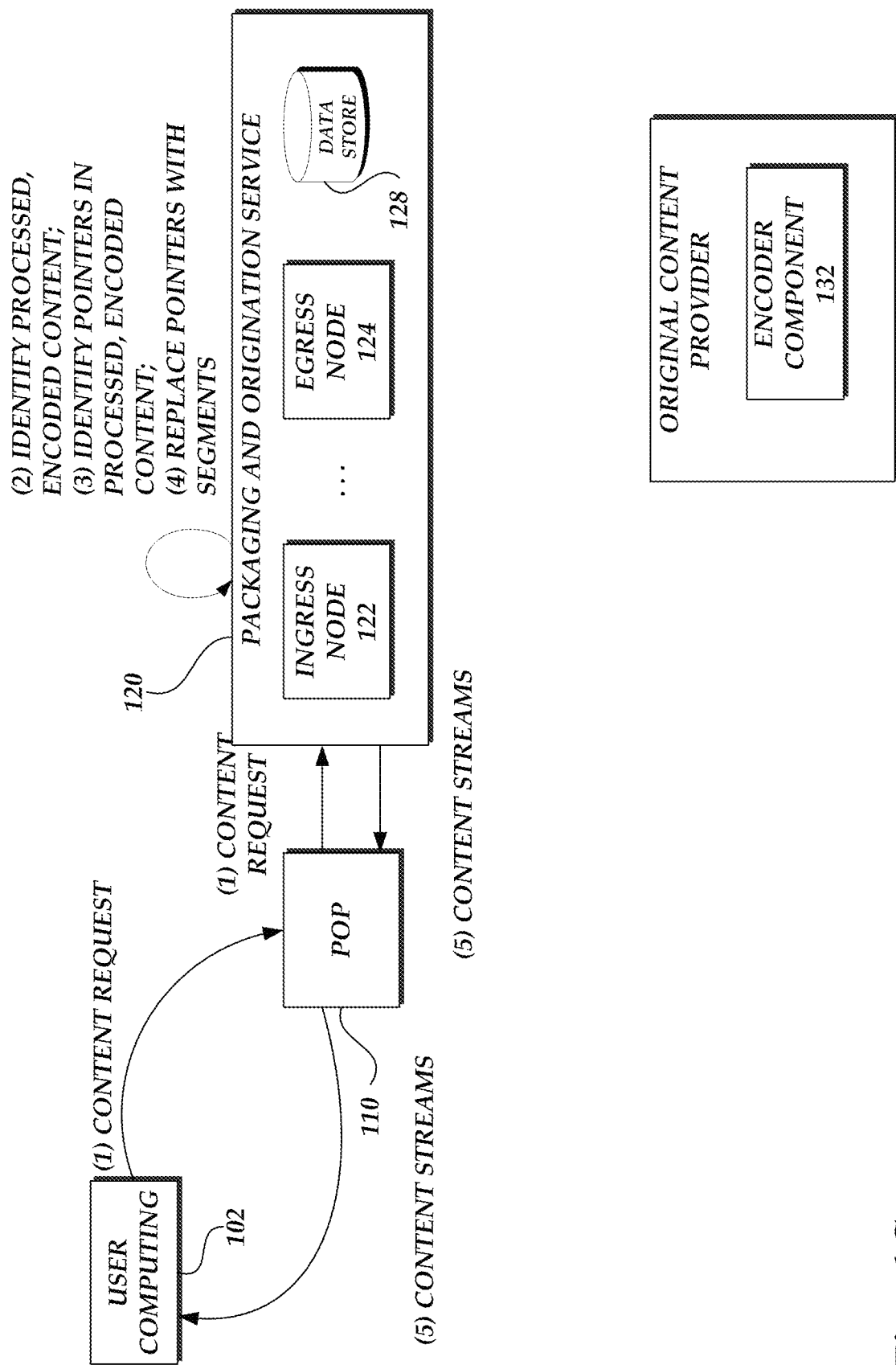

Turning now to FIGS. 6A-6C, an illustrative interaction for the processing of content requests will be described. With reference first to FIG. 6A, at (1), the original content provider 130 selects one or more encoders to generate encoded streams to the video packaging and origination service 120. Illustratively, the video packaging and origination service 120 may provide synchronization information, such as timestamp information or sequence information that allows multiple encoders to transmit at least some portion of the encoded content. In another embodiment, the original content provider 130 can utilize self-providing synchronization, information provided by a third-party service or a combination. At (2), the content provider transmits the one or more content streams.

At (3), the video packaging and origination service 120 receives the encoded content streams from the encoders.

Illustratively, the ingress component 122 of the video packaging and origination service 120 processes the received encoded segments to allow the video packaging and origination service 120 to generate outgoing content streams. As will be described in detail below, the egress component 124 can encode multiple processed, encoded content streams for storage or transmission to the CDN service provider 110 or user devices 102.

At (4), the ingress component 122 stores the encoded data stream. Illustratively, the ingress component 122 may store all received encoded content regardless of whether it is duplicative or alternative to what will be used by the video packaging and origination service 120. Illustratively, the ingress component 122 can illustratively utilize local storage resources to maintain the received encoded content segments regardless of whether the local storage resources maintain all the received encoded content segments.

At (5), the video packaging and origination service 120 selects the number of encoded content streams that will be generated for transmission based on the received content. Illustratively, the video packaging and origination service 120 can generate multiple encoding bitrate and format combinations that form the package of content streams that will be available to requesting clients. With reference to the previous example, the video packaging and origination service 120 can determine, or otherwise be configured, to generate three different encoding bitrates (e.g., 4 megabits, 6 megabits, and 10 megabits) for a format. As will be explained below, based on the selection of the number of encoding bitrates, the video packaging and origination service 120 can then generate processed, encoded content streams based on designated baseline renditions of the encoded content segments. The resulting package of the baseline rendition(s) and processed, encoded content will have a size that is less than a size of the package including complete versions of the baseline rendition and additional renditions.

With reference now to FIG. 6B, interactions between components of the content delivery environment 100 illustrating the generation of processed, encoded content will be described. At (1), the video packaging and origination service 120 generates the baseline encoding rendition for the identified package of encoded content streams. Illustratively, the baseline encoding content stream corresponds a designated set of encoded content segments that are encoded and will be utilized as reference frames for one or more additional processed, encoded content streams. In one embodiment, the encoder 124 generates the baseline encoded content stream in its entirety.

Subsequent to the processing of the baseline encoded content rendition, the video packaging and origination service 120 begins iteratively processing additional encoded content renditions identified for the package of encoded bitrates. For example, the baseline rendition may correspond to a lowest encoding bitrate. Additionally, the video packaging and origination service 120 can iteratively process each next higher bitrate rendition by substituting segments with pointers to the baseline rendition and possible intervening bitrate renditions. Illustratively, encoding bitrates having a higher encoding bitrate will have a number of common (or substantially common) segments with a baseline rendition of the encoded content segments and any lower encoded bitrate renditions. As described above, one or more segments in the higher encoded bitrate renditions may not meet the maximum bitrate for the rendition, which allows for the use of common segments across multiple bitrate renditions. Accordingly, the egress component 124 of the video packaging and origination service 120 iteratively selects the next higher encoding bitrates and begins encoding the content. At (2), as the content is begin encoded, the egress component 124 identifies one or more content segments that are considered to be common or substantially common such that the segments may be interchangeable without a measurable change in quality. In one embodiment, the egress component 124 can utilize synchronization information, such as timestamp information or frame reference numbers, to identify potentially common segments. In other embodiments, the egress component 124 can match the segment information by comparison of data size information (e.g., the size of the data in bits or bytes), checksums, hashes, etc. Still further, the egress component 124 can utilize quality measurements, such as pixel analysis or encoding quality measurements, to make a characterization of whether the segments are matched and considered to be interchangeable. In this embodiment, segments do not necessarily have to be identical matches, but can incorporate some variance as allowed by the techniques, such as hashing algorithms that generate identical hashing outcomes with slight variances in the segments. Still further, in the event that a quality difference between two compared segments meets a threshold or is otherwise considered sufficiently measurement, the segments may not be considered matching for purposes of the present application and may not be marked as such as described below.

At (3), the egress component 124 marks the content segments that are considered to be common with a baseline rendition or any previously process encoded, content segment. In one embodiment, the common segments may be associated with meta-data that allows the egress component 124 to identify the specific segment in another content segment that was determined to be matching, such as time stamp, storage locations, encoder identifiers, and the like. For example, the meta-data may be indicative of the renditions for which the particular segments apply or identifies other processing instructions, such as criteria for when to replace marked segments, how to replace marked segments, and the like.

At (4), the egress component 124 processes the marked segments. In one embodiment, the egress component 124 can replace any marked segment with pointers identifying the corresponding segment from a previous encoded rendition, such as the baseline rendition or intervening renditions. The pointers may be absolute pointers to the location in storage of the content segments. In other embodiments, the pointers may be relative pointers that identify the specific segment from another encoded content rendition without reference to the storage location of the encoded content rendition. As previously described, in some embodiments, encoded renditions corresponding to higher encoding bitrates may include reference to multiple lower bitrate renditions. In such embodiments, the pointers may include data identifying individual segments in addition to encoded content renditions. Based on replacement of the marked segments, the processed, encoded content streams may be illustratively left solely with pointers to common segments from the baseline reference and other lower bitrate processed segments and any non-common segments for that specific bitrate versions. In other embodiments, the egress component 124 can utilize additional criteria, such as the meta-data, that may control how and when marked segments are replaced. Accordingly, in some embodiments, the egress component 124 can utilize meta-data to choose not to replace segments, such as for limiting quality degradation, reducing processing time to reconstitute processed, encoded content streams, and the like.

At (5), the egress component 124 or other component of the video packaging and origination service can cause the generated processed, encoded content segments to be stored for later retrieval or transmission to other components of the content delivery environment 100. In one embodiment, the storage or transmission of the encoded content package can correspond to separate transmission of each processed, encoded content stream (e.g., baseline rendition and additional processed, encoded content streams). In another embodiment, the storage or transmission of the encoded content package can correspond to a single stream including the baseline reference encoded content and the additional processed encoded content segments. In this embodiment, the baseline rendition may be included in its entirety followed by any additional encoded segments corresponding to non-common segments. In other variation, the single content stream can include meta-data that identifies common reference segments in sequence with the additional encoded segments corresponding to non-common segments.

With reference to FIG. 6C, illustrative interactions for the generation of content streams from processed, encoded content will be described. Such interactions will be described based on interactions with the video packaging and origination service 120. In other embodiments, such interaction may be similar in processing content requests at the CDN service provider 110. At (1), the user device directly or through POP 110 transmits a request for encoded content to the video packaging and origination service 120. The interaction between the requesting entities and the video packaging and origination service 120 can include multiple interactions to identify available content and receive request for content. For example, a user device 102 may generate various user interfaces or software applications that facilitate the selection of content that are directed to the video packaging and origination service 120. As illustrated in FIG. 6B, the content requests from user devices 102 may be transmitted via a POP 110 or alternatively be transmitted directly from user devices 102 to the video packaging and origination service 120.

Illustratively, the video packaging and origination service 120 receives one or more requests for encoded content streams from requesting entities. To begin processing the content requests, at (2), the video packaging and origination service 120 identifies the processed, encoded content that corresponds to the content segment. If the request corresponds to content that does not include pointers or other references, the video packaging and origination service 120 can process the request by transmitting the requested content segment. Alternatively, the video packaging and origination service 120 will attempt to reconstitute the processed, encoded content into a set of encoded content segments that can be transmitted.

At (3), the video packaging and origination service 120 identifies pointers or other references in the encoded, processed content. As previously described, the pointers may be absolute pointers to the location in storage of the content segments. In other embodiments, the pointers may be relative pointers that identify the specific segment from another encoded content rendition without reference to the storage location of the encoded content rendition. As previously described, in some embodiments, encoded renditions corresponding to higher encoding bitrates may include reference to multiple lower bitrate renditions. In such embodiments, the pointers may include data identifying individual segments in addition to encoded content renditions. At (4), the video packaging and origination service 120 replaces the pointers with content segments from the baseline rendition and additional processed, encoded content streams. In some embodiments, the video packaging and origination service 120 can implement additional software processing, such as smoothing, data extrapolation, error correction, etc. to better integrate the segments that are added to the selected encoded content. In other embodiments in which multiple processed, encoded content segments are included in a single file/stream, the video packaging and origination service 120 can filter out identifiers for each respective bitrate to keep all common segments and non-overlapping segments for any defined encoding bitrate. At (5), the video packaging and origination service 120 can return the reconstituted encoded content.

Figure 7:
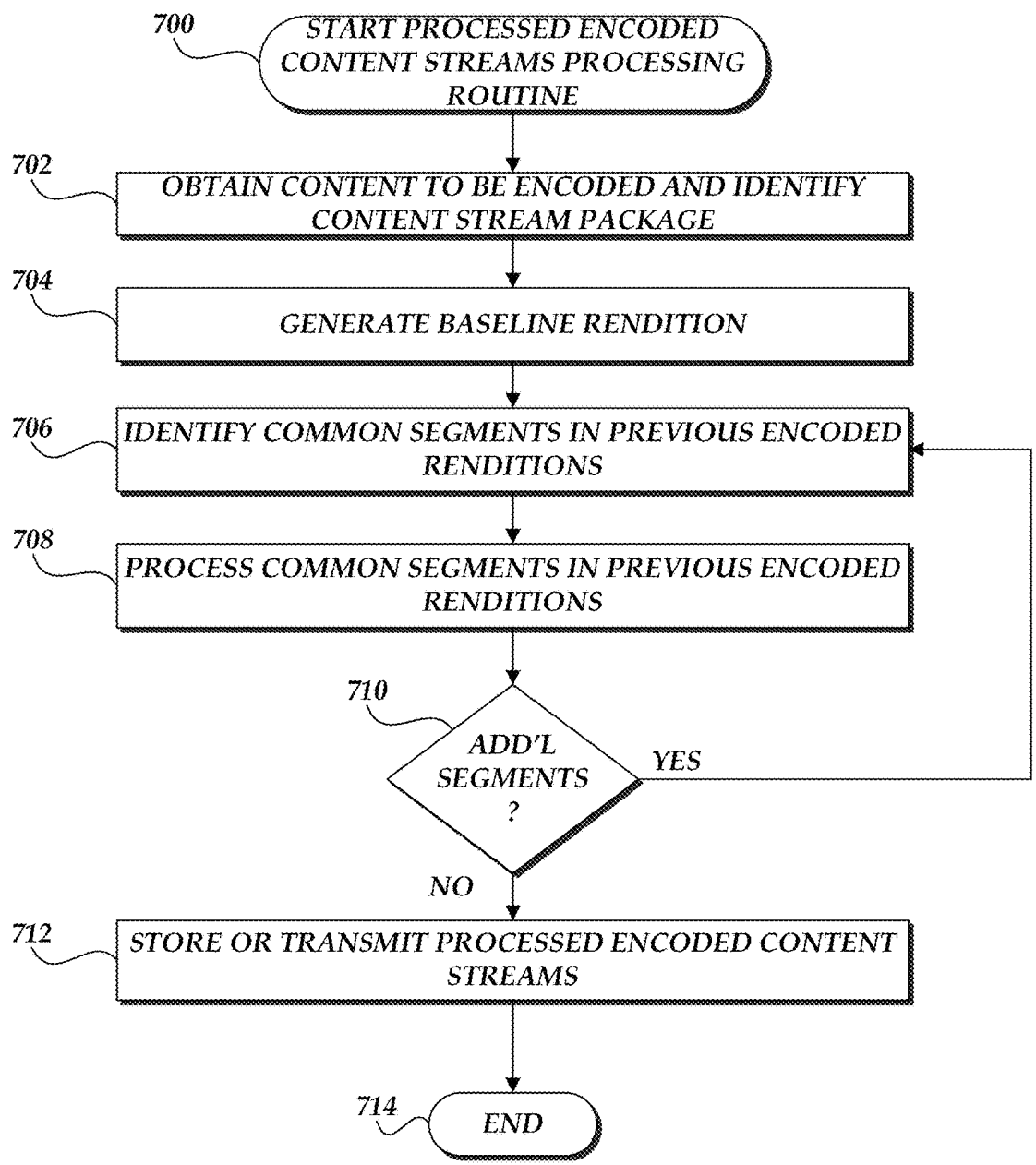
FIG. 7 is a flow diagram illustrative of an encoded content generation routine implemented by a video packaging and origination service.

Turning now to FIG. 7, a routine 700 utilized by the video packaging and origination service 120 to receive and process encoded content streams will be described. Routine 700 may be illustratively implemented by the video packaging and origination service 120, including one or more egress components 124 for encoding content according to a set of encoding bitrates (or encoded bitrate/format combinations).

At block 702, the video packaging and origination service 120 receives the encoded content streams from the encoders. Illustratively, the ingress component 122 of the video packaging and origination service 120 processes the received encoded segments to allow the video packaging and origination service 120 to generate outgoing content streams. As will be described in detail below, the egress component 124 can encode multiple processed, encoded content streams for storage or transmission to the CDN service provider 110 or user devices 102.

At block 702, the video packaging and origination service 120 selects the number of encoded content streams that will be generated for transmission based on the received content. Illustratively, the video packaging and origination service 120 can generate multiple encoding bitrate and format combinations that form the package of content streams that will be available to requesting clients. With reference to the previous example, the video packaging and origination service 120 can determine, or otherwise be configured, to generate three different encoding bitrates (e.g., 4 megabits, 6 megabits, and 10 megabits) for an encoding format. As will be explained below, based on the selection of the number of encoding bitrates, the video packaging and origination service 120 can then generate one or more processed, encoded content streams based on designated baseline renditions of the encoded content segments.

At block 704, the video packaging and origination service 120 generates the baseline encoding rendition for the identified package of encoded content streams. Illustratively, the baseline encoding content stream corresponds to a designated set of encoded content segments that are encoded and will be utilized as reference frames for one or more additional processed, encoded content streams. In one embodiment, the egress component 124 generates the baseline encoded content stream in its entirety. In other embodiments, the egress component 124 can generate multiple baseline renditions for utilization in accordance with the present application. Still further, in some embodiments, the video packaging and origination service 120 can designate a reference set of segments for utilization in the comparison of additional encoded content bitrate renditions. In this example, the egress component 124 can utilize a bitrate rendition version that may not necessarily be part of the identified package but has been previously encoded or is otherwise available.

Subsequent to the processing of the baseline encoded content rendition, the video packaging and origination service 120 begins an iterative process for processing additional encoded content identified for the package of encoded bitrates. Illustratively, encoding bitrates having a higher encoding bitrate will have a number of comment (or substantially common) segments with a baseline rendition of the encoded content segments and any lower encoded bitrate renditions such that utilization of the segments from the baseline rendition or intervening renditions will not result in a noticeable difference in quality or perceived quality. Such segments can occur in embodiments in which segments do not utilize the maximum bitrate for defined for the specific rendition. Accordingly, the egress component 124 video packaging and origination service 120 selects the next higher encoding bitrates and begins encoding the content. At block 706, the egress component 124 identifies one or more content segments that are considered to be interchangeable. In one embodiment, the egress component 124 can utilize synchronization information, such as timestamp information or frame reference numbers, to identify potentially common segments. One skilled in the relevant art will appreciate that segments having common timestamp or time synchronization information do not necessarily result in common or interchangeable segments. Accordingly, the egress component 124 can match the segment information by comparison of data size information, checksums, hashes, or other quality measurements or approximations that results in a characterization of segments being interchangeable. In such embodiments, two compared segments do not necessarily have to be identical matches, but can incorporate some variance as allowed by the techniques, such as hashing algorithms that generate identical hashing outcomes with slight variances in the segments. As described above, in the event that a quality difference between two compared segments meets a threshold or is otherwise considered sufficiently measurement, the segments may not be considered matching for purposes of the present application and may not be marked as such as described below.

At block 708, the egress component 124 marks and processes the content segments that are considered to be common with a baseline rendition or any previously process encoded, content segment. In one embodiment, the common segments may associated with meta-data that allows the egress component 124 to identify the specific segment in another content segment that was determined to be matching, such as time stamp, storage locations, encoder identifiers, and the like. For example, the meta-data may be indicative of the renditions for which the particular segments apply or identifies other processing instructions, such as criteria for when to replace marked segments, how to replace marked segments, and the like. For example, if two renditions include two segments related to a common timestamp or reference, but have a sufficiently quality variation that exceeds a threshold or otherwise results in a discernable difference to a consumer, the egress component 124 will not mark the segments as characterized as interchangeable.

In one embodiment, the egress component 124 can replace any marked segment with pointers identifying the corresponding segment from a previous encoded rendition, such as the baseline rendition. The pointers may be absolute pointers to the location in storage of the content segments. In other embodiments, the pointers may be relative pointers that identify the specific segment from another encoded content rendition without reference to the storage location of the encoded content rendition. As previously described, in some embodiments, encoded renditions corresponding to higher encoding bitrates may include reference to multiple lower bitrate renditions. In such embodiments, the pointers may include data identifying individual segments in addition to encoded content renditions. Based on replacement of the marked segments, the processed, encoded content streams may be illustratively left solely with pointers to interchangeable segments from the baseline reference and other lower bitrate processed segments and any non-common or non-interchangeable segments for that specific bitrate versions. As previously described, in some embodiments, the egress component 124 can utilize additional criteria, such as the meta-data, that may control how and when marked segments are replaced. Accordingly, in some embodiments, the egress component 124 can utilize meta-data to choose not to replace interchangeable segments, such as for limiting quality degradation, reducing processing time to reconstitute processed, encoded content streams, and the like.

At decision block 710, the video packaging and origination service 120 conducts a test to determine whether additional processed, encoded segments should be generated based on the identified package of encoded content segments. If so, the routine 700 returns to block 706 to process the next encoded bitrate rendition. If not, the routine 700 proceeds to block 712.

At block 712, the egress component 124 or other component of the video packaging and origination service can cause the generated processed, encoded content segments to be stored for later retrieval or transmission. In one embodiment, the storage or transmission of the encoded content package can correspond to separate transmission of each processed, encoded content stream (e.g., baseline rendition and additional processed, encoded content streams). In another embodiment, the storage or transmission of the encoded content package can correspond to a single stream including the baseline reference encoded content and the additional processed encoded content segments. In this embodiment, the baseline rendition may be included in its entirety followed by any additional encoded segments corresponding to non-common segments. In other variation, the single content stream can include meta-data that identifies common reference segments in sequence with the additional encoded segments corresponding to non-common segments. At block 714, the routine 700 terminates or repeats.

Figure 8:
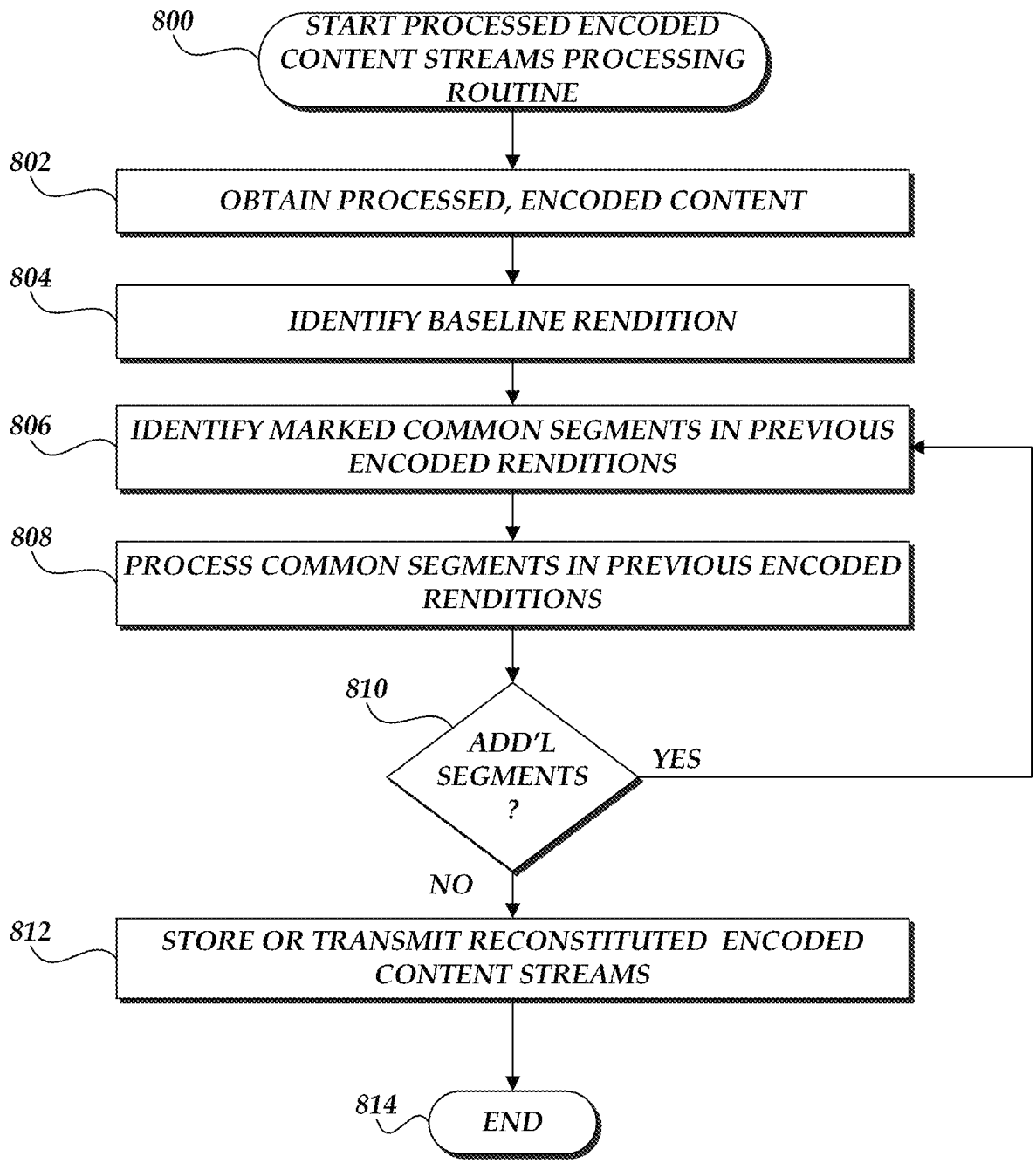
FIG. 8 is a flow diagram illustrative of a processed, encoded content processing routine.

Turning now to FIG. 8, a routine 800 utilized to receive and process previously processed, encoded content streams will be described. Routine 800 may be illustratively implemented by the video packaging and origination service 120, including one or more egress components 124 for encoding content according to a set of encoding bitrates (or encoded bitrate/format combinations). Routine 800 may also be implemented by the media processing component 114 at one or more POPs/edge 112. Routine 800 may also be implemented at user devices to allow for multiple content stream processing by user devices utilizing the processed, encoded streams.

At block 802, the video packaging and origination service 120 receives the processed, encoded content streams from the encoders. Illustratively, the ingress component 122 of the video packaging and origination service 120 processes the received encoded segments to allow the video packaging and origination service 120 to generate outgoing content streams. As will be described in detail below, the egress component 124 can encode multiple processed, encoded content streams for storage or transmission to the CDN service provider 110 or user devices 102.

At block 804, the video packaging and origination service 120 identifies the baseline encoding rendition for the identified package of encoded content streams. Illustratively, the baseline encoding content stream corresponds to a designated set of encoded content segments that are encoded and will be utilized as reference frames for one or more additional processed, encoded content streams. In one embodiment, the encoder 124 generates the baseline encoded content stream in its entirety.

Subsequent to the identification of the baseline encoded content rendition, the video packaging and origination service 120 begins an iterative process for reconstituting the additional encoded content identified for the package of encoded bitrates. Illustratively, encoding bitrates having a higher encoding bitrate will have a number of comment (or substantially common) segments with a baseline rendition of the encoded content segments and any lower encoded bitrate renditions. Accordingly, the egress component 124 video packaging and origination service 120 selects the next higher encoding bitrates and begins encoding the content. At block 806, the egress component 124 identifies one or more content segments that are marked to be common or substantially common. As previously described, the egress component 124 can utilize synchronization information, such as timestamp information or frame reference numbers, to identify common segments. In other embodiments, the egress component 124 has previously characterized the segments as interchangeable by comparison of information, checksums, hashes, quality measurements, and the like. In this embodiment, segments do not necessarily have to be identical matches, but can incorporate some variance as allowed by the techniques, such as hashing algorithms that generate identical hashing outcomes with slight variances in the segments.

At block 808, the egress component 124 processes the content segments that are considered to be interchangeable with a baseline rendition or any previously process encoded, content segment. In one embodiment, the common segments may be associated with meta-data that allows the egress component 124 to identify the specific segment in another content segment that was determined to be matching, such as time stamp, storage locations, encoder identifiers, and the like.

In one embodiment, the egress component 124 can replace any pointers identifying a corresponding segment from a previous encoded rendition, such as the baseline rendition, with the actual interchangeable segment from the other rendition. The pointers may be absolute pointers to the location in storage of the content segments. In other embodiments, the pointers may be relative pointers that identify the specific segment from another encoded content rendition without reference to the storage location of the encoded content rendition. As previously described, in some embodiments, encoded renditions corresponding to higher encoding bitrates may include reference to multiple lower bitrate renditions. In such embodiments, the pointers may include data identifying individual segments in addition to encoded content renditions. Based on replacement of the marked segments, the processed, encoded content streams may be illustratively left solely with pointers to common segments from the baseline reference and other lower bitrate processed segments and any non-common segments for that specific bitrate versions.

At decision block 810, the video packaging and origination service 120 conducts a test to determine whether additional processed, encoded segments should be generated based on the identified package of encoded content segments. If so, the routine 800 returns to block 806 to process the next encoded bitrate rendition. If not, the routine 800 proceeds to block 812.

At block 812, the egress component 124 or other component of the video packaging and origination service can cause the full complete version of the identified package of encoded content segments to be stored for later retrieval or transmission. At block 814, the routine 800 terminates or repeats.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage streaming content comprising:
one or more computing devices associated with an encoder for generating content, wherein the encoder is configured to:
receive content to be encoded in a plurality of encoding bitrates;
generate a baseline encoded bitrate rendition corresponding to a lowest encoding bitrate in the plurality of encoding bitrates;
generate one or more additional bitrate renditions corresponding to at least one additional encoding bitrate in the plurality of encoding bitrates, the at least one additional encoding bitrate greater than the lowest encoding bitrate of the baseline encoded bitrate rendition;
process a set of encoded content segments by;
characterizing one or more segments in the one or more additional renditions and corresponding segments from at least one of the baseline encoded bitrate rendition and any intervening bitrate renditions as matching segments that are interchangeable based on common segment redundancies, wherein generating the one or more additional bitrate renditions includes marking the one or more segments in the one or more additional bitrate renditions as interchangeable based on matching the one or more segments in the one or more additional bitrate renditions with segments from the baseline encoded bitrate rendition; and
replacing the matching one or more segments in the one or more additional bitrate renditions with pointers to the corresponding matching segments from the at least one of the baseline encoded bitrate rendition and the any intervening bitrate renditions to reduce at least one of storage or transmission footprint; and
at least one of store or transmit the processed set of encoded content segments.

2. The system of claim 1, wherein the encoder is further configured to receive a request to transmit a complete version of an encoded bitrate rendition and to reconstitute the encoded bitrate rendition responsive to the request.

3. The system of claim 2, wherein the encoder reconstitutes the encoded bitrate rendition by:
identifying pointers in the requested encoded bitrate rendition associated with one or more segments; and
replacing the identified pointers with interchangeable content segments from the at least one of the baseline encoded bitrate rendition and the any intervening bitrate renditions.

4. The system of claim 1, wherein the encoder transmits the processed set of encoded content segments as a single stream.

5. The system of claim 1, wherein the encoder transmits the processed set of encoded segment as separate renditions.

6. A computer-implemented method to manage encoding of content comprising:
determining a set of encoded segments to be provided as a package of encoded content;
generating a baseline rendition of the encoded content and at least one additional rendition forming the package of encoded content, wherein an encoding bitrate associated with the at least one additional rendition is greater than an encoding bitrate associated with the baseline rendition;
identifying, based on common segment redundancies, one or more segments in the at least one additional rendition and corresponding segments in the baseline rendition as matching segments that are interchangeable, wherein generating the at least one additional rendition includes marking the one or more segments in the at least one additional rendition as interchangeable based on matching the one or more segments in the at least one additional rendition with segments from the baseline rendition; and
replacing the identified one or more segments in the at least one additional rendition with at least one pointer to the corresponding interchangeable segments from the baseline rendition.

7. The computer-implemented method of claim 6 further comprising receiving content to be provided.

8. The computer-implemented method of claim 6 further comprising processing the marked one or more segments in the at least one additional rendition.

9. The computer-implemented method of claim 8, wherein processing the marked one or more segments includes replacing the marked one or more segments with pointers from at least the baseline rendition.

10. The computer-implemented method of claim 8, wherein processing the marked one or more segments includes replacing the marked one or more segments with pointers from the baseline rendition and any intervening bitrate renditions.

11. The computer-implemented method of claim 6 further comprising storing the generated baseline rendition of the encoded content and the at least one additional rendition.

12. The computer-implemented method of claim 6 further comprising transmitting the generated baseline rendition of the encoded content and the at least one additional rendition.

13. The computer-implemented method of claim 6 further comprising receiving a request to transmit a complete version of an encoded bitrate rendition.

14. The computer-implemented method of claim 13 further comprising reconstituting the encoded bitrate rendition responsive to the request.

15. A computer-implemented method to manage transmission of content comprising:

identifying a set of encoded segments that will be provided as a package of encoded content;

generating one or more bitrate renditions including pointers to one or more interchangeable segments from a reference, wherein an encoding bitrate associated with the one or more bitrate renditions is greater than an encoding bitrate associated with the reference, wherein the one or more interchangeable segments from the reference are characterized as matching corresponding segments from the one or more bitrate renditions based on common segment redundancies; and at least one of storing or transmitting at least one additional bitrate rendition of the one or more bitrate renditions, wherein generating the one or more bitrate renditions including pointers to the one or more interchangeable segments from the reference includes marking one or more segments in the at least one additional bitrate rendition based on matching the one or more interchangeable segments from the reference.

16. The computer-implemented method of claim 15, wherein the reference corresponds to a baseline rendition.

17. The computer-implemented method of claim 15, wherein the at least one of storing or transmitting the at least one additional bitrate rendition includes at least one of storing or transmitting a compilation of the set of encoded content segments as a single stream.

18. The computer-implemented method of claim 15, wherein the at least one of storing or transmitting the at least one additional bitrate rendition includes at least one of storing or transmitting a compiled set of encoded content segments as separate renditions.

* * * * *